Figure 1:
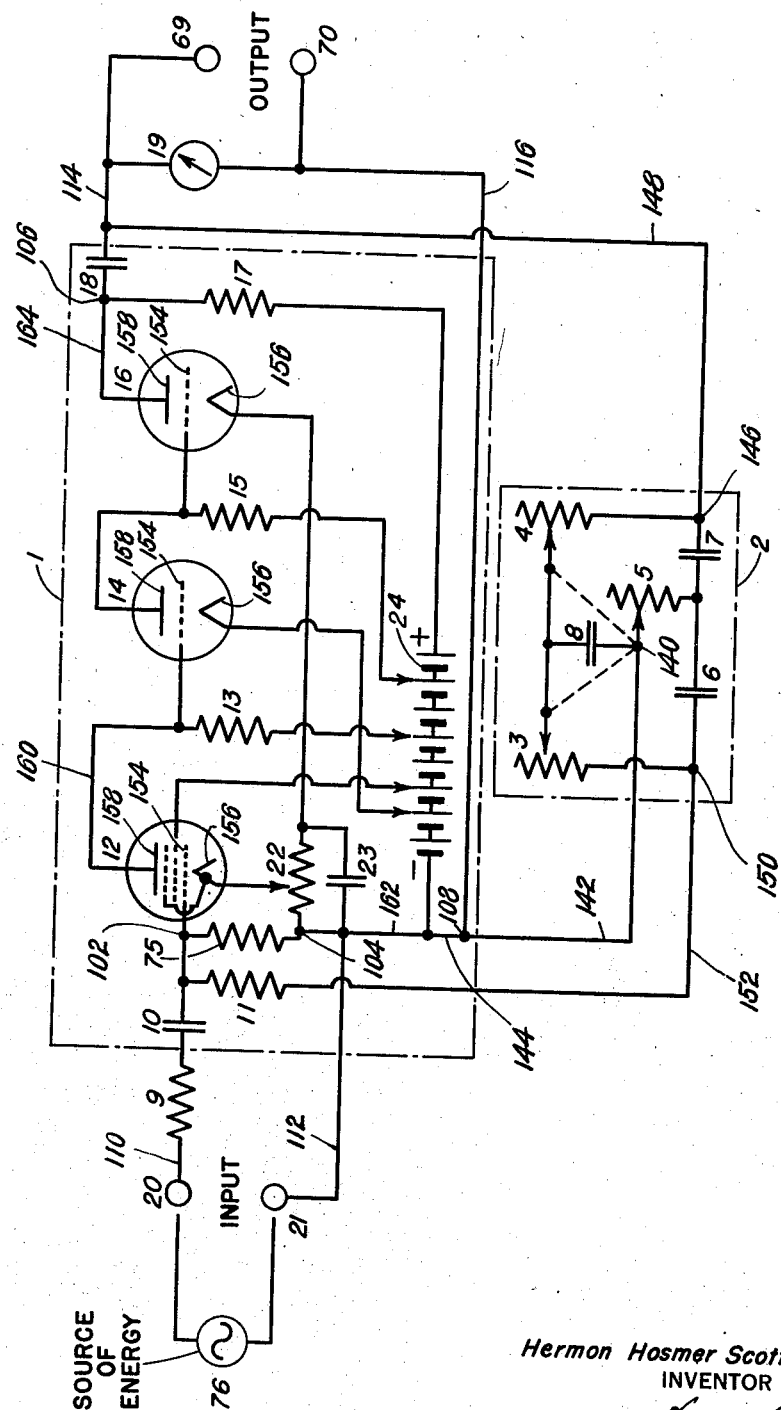

Sept. 19, 1939.                H. H. SCOTT                2,173,426
                              ELECTRIC SYSTEM
                           Filed Aug. 30, 1937           7 Sheets-Sheet 1

Hermon Hosmer Scott
INVENTOR

BY David Rines
ATTORNEY

Sept. 19, 1939.   H. H. SCOTT   2,173,426
ELECTRIC SYSTEM
Filed Aug. 30, 1937   7 Sheets—Sheet 2

Hermon Hosmer Scott
INVENTOR

BY David Rines
ATTORNEY

Sept. 19, 1939.    H. H. SCOTT    2,173,426
ELECTRIC SYSTEM
Filed Aug. 30, 1937    7 Sheets-Sheet 3

Hermon Hosmer Scott
INVENTOR

BY *David Rines*

ATTORNEY

Sept. 19, 1939.  H. H. SCOTT  2,173,426
ELECTRIC SYSTEM
Filed Aug. 30, 1937  7 Sheets-Sheet 4

Hermon Hosmer Scott.
INVENTOR

BY *David Rines*
ATTORNEY

Sept. 19, 1939.    H. H. SCOTT    2,173,426
ELECTRIC SYSTEM
Filed Aug. 30, 1937    7 Sheets-Sheet 5

HERMON HOSMER SCOTT
INVENTOR
BY David Rines
ATTORNEY

Sept. 19, 1939.    H. H. SCOTT    2,173,426
ELECTRIC SYSTEM
Filed Aug. 30, 1937    7 Sheets-Sheet 6

Hermon Hosmer Scott.
INVENTOR
BY David Rines
ATTORNEY

Sept. 19, 1939.  H. H. SCOTT  2,173,426
ELECTRIC SYSTEM
Filed Aug. 30, 1937  7 Sheets-Sheet 7

Hermon Hosmer Scott
INVENTOR
BY (signature)
ATTORNEY

Patented Sept. 19, 1939

2,173,426

UNITED STATES PATENT OFFICE 2,173,426

ELECTRIC SYSTEM

Hermon Hosmer Scott, Somerville, Mass., assignor to General Radio Company, Cambridge, Mass., a corporation of Massachusetts Application August 30, 1937, Serial No. 161,621

50 Claims. (Cl. 178—44)

The present invention relates to electric systems, and more particularly to systems for selecting predetermined frequencies from currents or voltages containing a number of different frequencies.

An electric system may transmit or amplify either a single frequency, or a band of frequencies, eliminating or attenuating other frequencies. A single frequency to which an electric system is selective may be regarded as that frequency which the system transmits at substantially maximum amplitude. In the case of a band of frequencies to which the system is selective, that band may be regarded as including those frequencies which are transmitted at a level not less than a predetermined value, say, three decibels, below the maximum transmission in that band.

Various devices are in use or have been proposed for obtaining an electrical circuit which is selective with regard to frequency. The tuned circuits used in radio receivers, and conventional types of filters employing inductances and condensers are examples of widely-used types of selective circuits. Such devices are satisfactory at higher frequencies, but as the frequency is lowered the size of the inductances and condensers becomes increasingly larger. In particular, the inductances for low frequencies are frequently cumbersome and expensive and, because of the large amount of wire with which they must be wound, the resistance is so high as often to make it difficult or even impossible to obtain a satisfactory degree of selectivity.

Further, the use of iron cores in the inductances often results in harmonic distortion and many common types of inductances are subject to magnetic interference; that is, the presence of alternating magnetic fields generated by other electrical equipment will cause interfering voltages to be picked up by the inductances in the filter or tuned circuit, thus causing undesired signals to be present in the output.

A further difficulty is encountered in those cases where it is desired to vary the frequency response or pass band over wide ranges of frequency. Since the problem of varying either inductances or condensers becomes increasingly serious as their size increases, in many variable filter systems only the inductances or the condensers are varied. Such an arrangement is generally satisfactory over a relatively small change in frequency, but for large percentage changes this results in serious impedance shifts and variations in sensitivity.

One common use for sharply-selective circuits is in the analysis of complicated electrical waves, the selective circuits being tuned successively to each of the component frequencies of the wave in order to obtain an individual evaluation of each component. To fix the ideas, an analyzer may be considered to comprise a combination of a selective circuit and some form of indicator for indicating the output or the transmission of said selective circuit. Conventional tuned circuits using inductances and condensers have been used for this purpose, but they are generally bulky, expensive and subject to magnetic interference. A more common method is the heterodyne-type analyzer in which the wave to be measured is heterodyned with a practically sinusoidal wave-form obtained from a vacuum-tube oscillator or other similar source in order to produce a resulting beat note which can be passed through a fixed filter. The frequency to which a system of this type is selective is determined by the frequency of the sinusoidal wave-form with which the unknown wave-form is heterodyned, while the filter circuits themselves remain fixed. One serious disadvantage of this arrangement is that, regardless of the frequency to which the system responds, the band width or selectivity curve has the same width in cycles per second. This often results in unusually sharp selectivity at high frequencies, and broad selectivity at low frequencies.

Selective circuits incorporating resistances and condensers but no inductances have been proposed and used for a few special applications, but the usual circuit of this type does not have as sharp selectivity as is generally desired and also causes a large loss in transmission even at those frequencies where the transmission is greatest.

One of the objects of the present invention is to provide a selective electrical circuit, the response of which may be varied over wide frequency ranges without complicated tuning and switching mechanisms and without any serious shifts in the input and output impedances of the system or its sensitivity. One of the important features of the invention is that this result may be obtained without necessitating the use of any inductances whatsoever, using a frequency-determining system which may consist of resistances and condensers only. The frequency to which such a system is selective can, accordingly, be varied by merely varying resistances or condensers, or both resistances and condensers.

Another object of the present invention is to provide a selective circuit, the selectivity curve of which is a percentage function of frequency. Such a device is particularly valuable in many types of sound-analysis work where the waveform being analyzed is obtained from a microphone and amplifier and represents the waveform of the sound which it is desired to analyze.

Another object of this invention is to provide a selective circuit, the selectivity or band width of which may be varied without changing any of the frequency-determining elements.

A further object is to provide a novel selective amplifier.

Still another object of the invention is to provide a novel wave filter.

Still another object of the invention, furthermore, is to provide a new and improved wave or hamonic analyzer.

Inverse feed-back or degenerative systems are now in use in order to obtain a substantially equal frequency response over wide frequency ranges. A characteristic of such systems is that the over-all amplification or sensitivity is considerably reduced by the introduction of degeneration. A feature of this invention, on the other hand, with the above objects in view, is to employ the inverse feed-back principle, not to obtain equal response over a wide range of frequency, but rather to obtain a response which is sharply selective with regard to frequency. An important feature of this type of inverse feed-back system is that the desirable characteristics are obtained without appreciable loss of sensitivity or amplification, that is, the sensitivity of the system at its point of maximum response may be made the same as without the inverse feed-back arrangement.

Other and further objects will be explained hereinafter and will be particularly pointed out in the accompanying claims.

Figure 2:
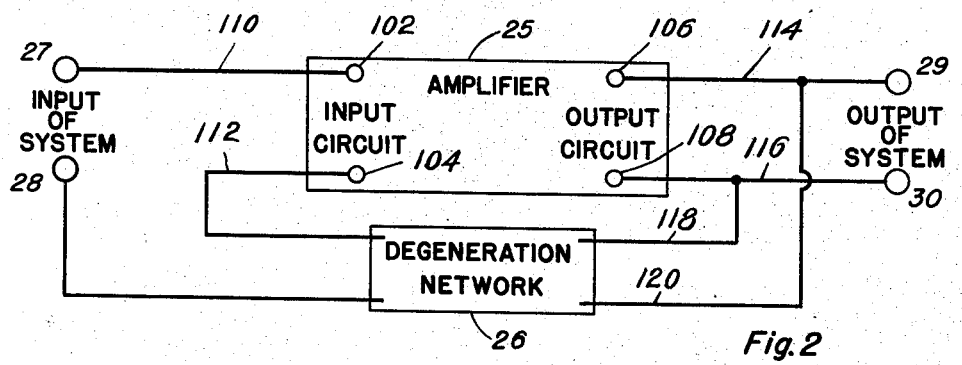
Figure 3:
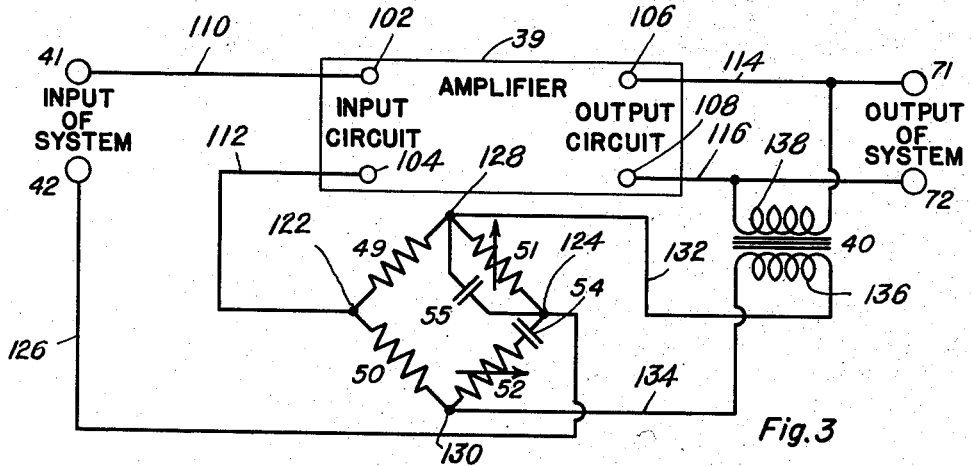
Figure 4:
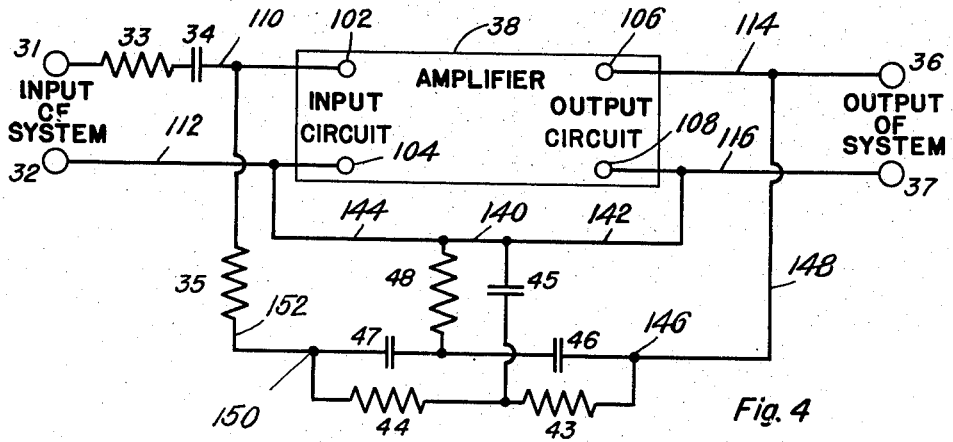
Figure 5:
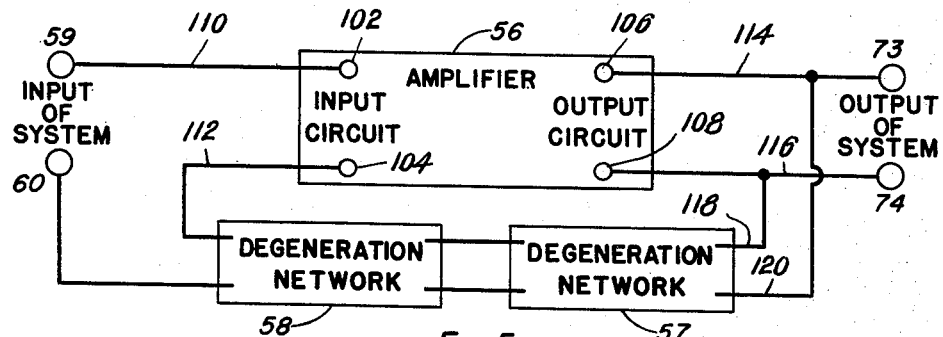
Figure 6:
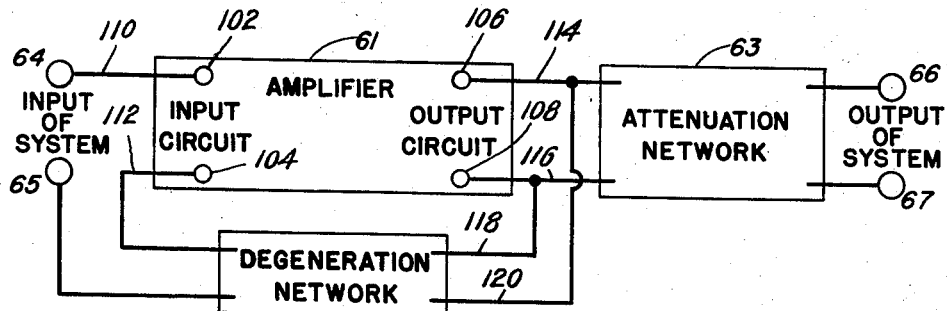
Figure 7:
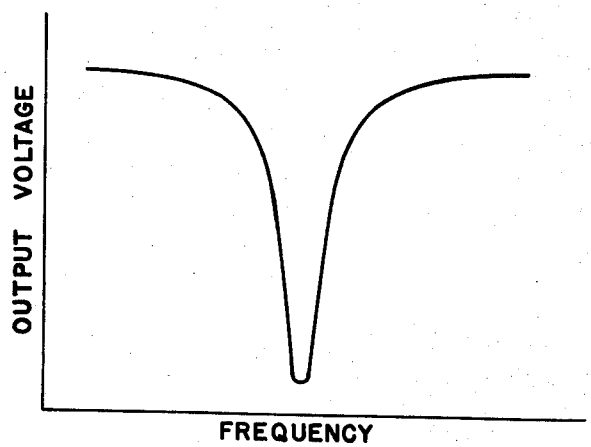
Figure 13:
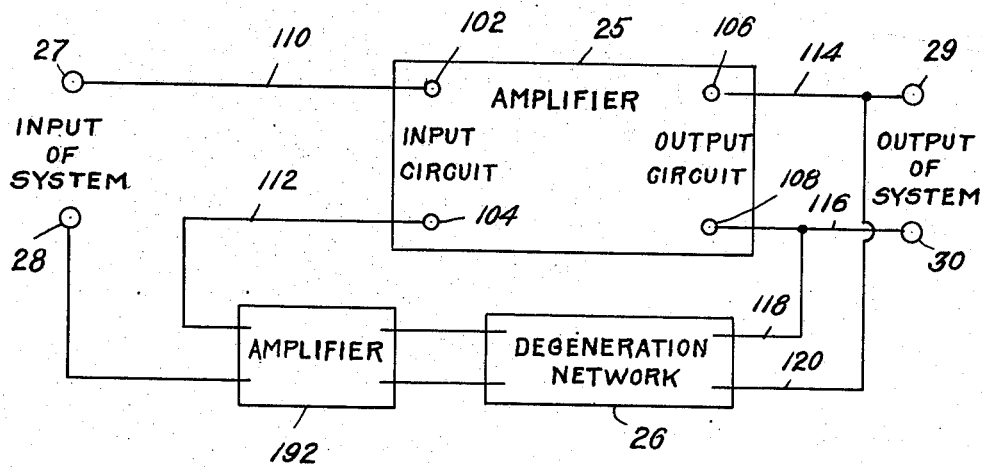
Figure 8:
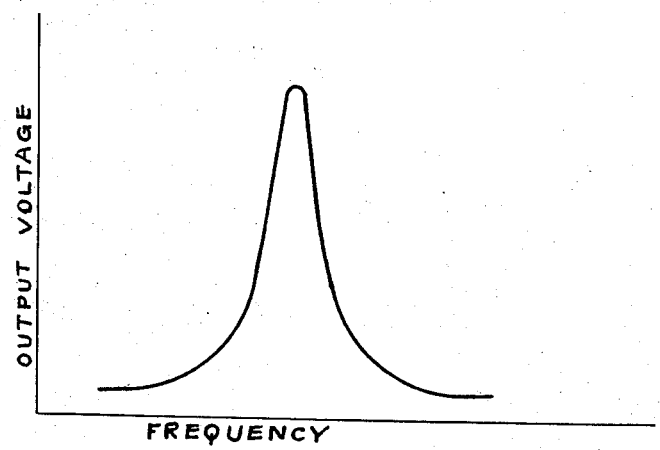
Figure 9:
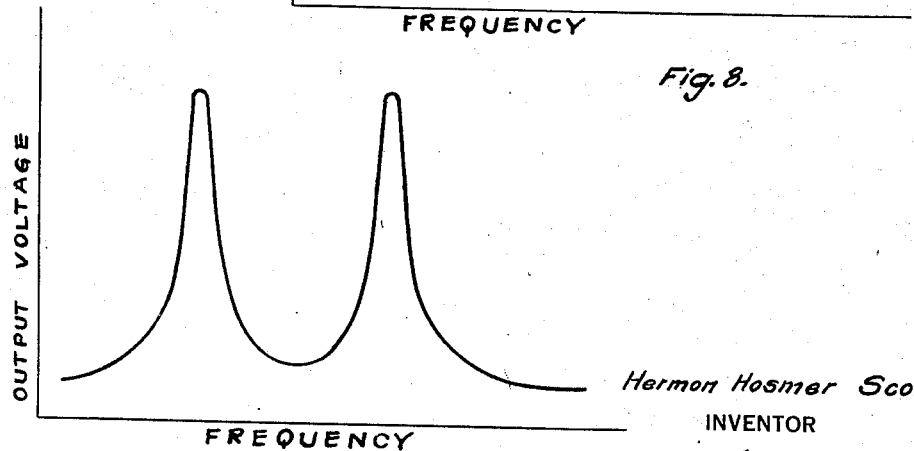

The invention will now be explained in connection with the accompanying drawings, in which Figure 1 is a diagrammatic and simplified view of circuits and apparatus arranged and constructed according to a preferred embodiment of the present invention; Figure 2 is a further simplified diagrammatic view illustrating a principle underlying the invention; Figure 3 is a view similar to Figure 2, illustrating one form of degeneration network; Figure 4 is a similar view illustrating another form of degeneration network; Figures 5 and 6 are views similar to Figure 2 of modifications; Figure 7 is a diagram illustrating a response curve that is representative of many prior-art types of networks, including the hereinafter described degenerative network; Figure 8 is a similar diagram illustrating a response curve in accordance with the present invention; Figure 9 is a diagram similar to Figure 8 illustrating a modified response curve; and Figures 10 to 13 are views of further modifications.

The response curve shown in Fig. 7, showing the relation between the output voltage and the frequency, is representative of many types of networks, including some combinations of resistance, capacitance and inductance, or mechanical, piezo-electric or magnetostriction devices. The characteristic feature of a curve of this type is that a single frequency or band of frequencies is cancelled out practically entirely, while a reasonable degree of transmission is obtained at other frequencies. In other words, such a device is a form of band-elimination filter.

Such a characteristic can be obtained in a network using only resistances and capacitors such as, for instance, the Wheatstone bridge, including the Wien bridge, and a double-T or parallel-T network. The Wien bridge, for example, illustrated in Fig. 3, is provided with resistors 49, 50, 51 and 52 in its respective arms, and capacitances 54 and 55 respectively in series with and in shunt to the respective resistors 52 and 51. The resistors 49 and 50 are preferably fixed and the resistors 51 and 52 are variable. The parallel-T network consists, as its name implies, of two T networks connected in parallel, as illustrated in Figs. 1 and 4. In Fig. 1, the network includes the circuit elements in the broken line marked 2. It is illustrated as comprising only resistances 3, 4 and 5 (Fig. 1) or 43, 44 and 48 (Fig. 4) and condensers 6, 7 and 8 (Fig. 1) or 45, 46 and 47 (Fig. 4), since this is a convenient form of such a network, but inductances may also be included if desired. The particular T network shown in Figs. 1 and 4 has certain desirable characteristics which will be discussed later.

Figure 12:
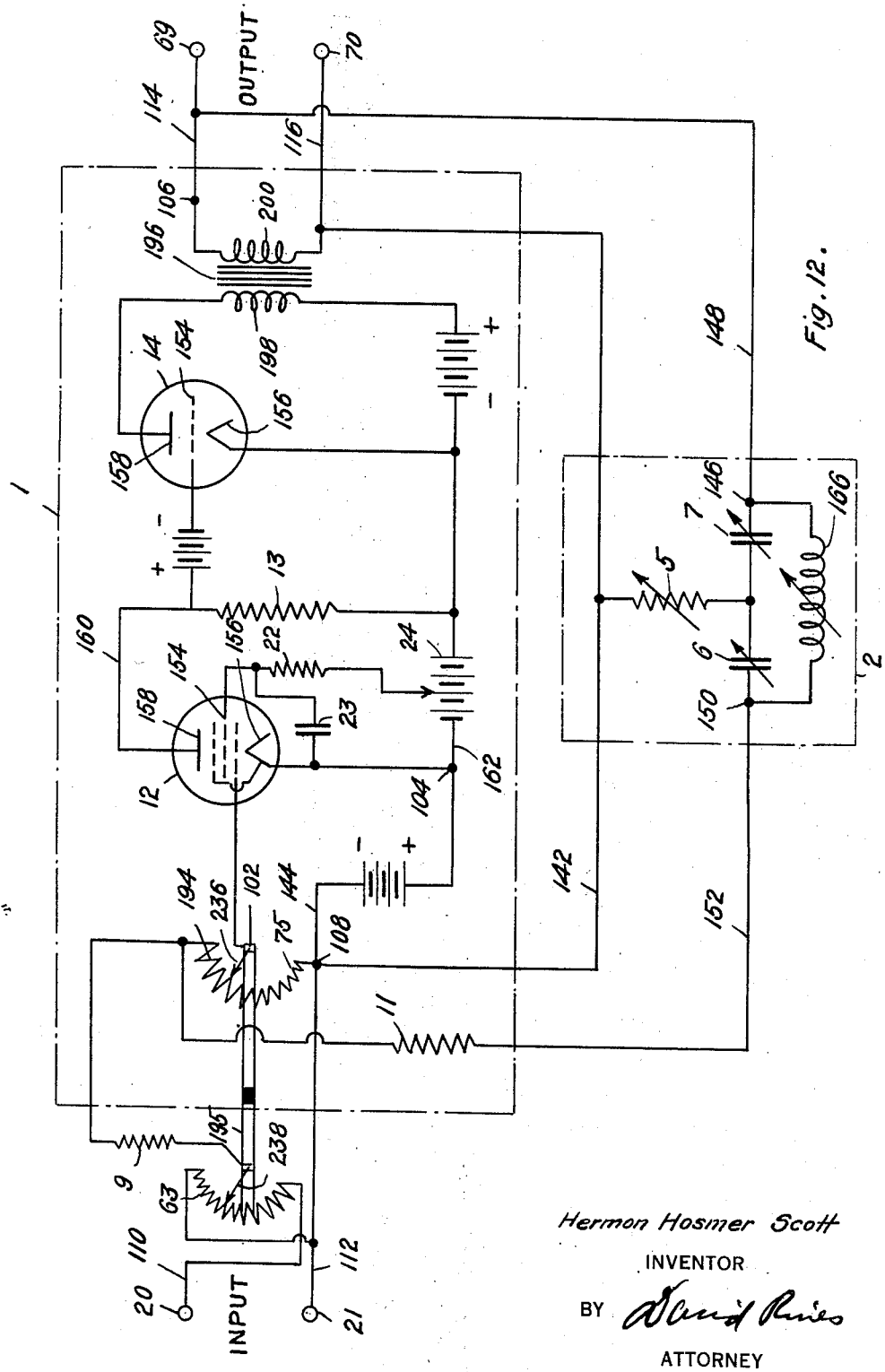

A bridged-T network may comprise only a single T network as, for instance, the circuit elements 5, 6 and 7 of Fig. 1, or 48, 47 and 46 of Fig. 4, but with another impedance connected directly in shunt with the two series arms 6 and 7 or 46 and 47, respectively. This is illustrated in Fig. 12, the impedance connected between the opposite terminals of capacitances 6 and 7 being represented by the coil 166. It will be understood that the bridge-T, like the parallel-T, network is not restricted to resistors and capacitors. The elements of both networks may comprise any combination of impedances, including inductors.

The desired characteristics for a selective circuit in accordance with the present invention, as previously outlined, may be practically the inverse of that shown in Fig. 7; that is, the circuit should respond to a single frequency or a narrow band of frequencies and should attenuate or eliminate frequencies outside of this range, so as to yield a response curve somewhat of the character illustrated in Fig. 8.

In accordance with a principle of this invention, therefore, a circuit having the characteristic shown in Fig. 7 may be combined with suitable auxiliary apparatus so that the net overall characteristic shall be as shown in Fig. 8. The inverse of the usual characteristic of the curve is thus obtained, a band-suppression network being employed to produce a band-pass system.

This may be effected in any desired way, as, for example, is diagrammatically illustrated in Fig. 2. The amplifier 25 there diagrammatically illustrated my be of ny desired type, providing an amount of gain, the importance of which will be discussed hereinafter. The amplifier is designated in other figures by other numerals: 1 in Fig. 1, 39 in Fig. 3, 38 in Fig. 4, 56 in Fig. 5 and 61 in Fig. 6. It is shown provided with input terminals 102 and 104, connected to its input circuit, and output terminals 106 and 108, connected to its output circuit. The input terminals 102 and 104 may be connected by conductors 110 and 112 to a source of energy through the medium of terminals 27 and 28, which constitute the input terminals of the system. Such a source of energy is shown in Fig. 1 at 76 but is omitted from Fig. 2 and other figures, for clearness. In other figures, the terminals 27, 28 are represented by other numerals, as 20, 21 (Fig. 1), 41, 42 (Fig. 3), 31, 32 (Fig. 4), 59, 60 (Fig. 5), and 64, 75

65 (Fig. 6). In Fig. 2, the terminals 102 and 27 are shown directly connected together by the conductor 110, and the terminal 104 is shown connected by the conductor 112 to the terminal 28 indirectly, in series with a degenerative network 26, as hereinafter more fully described. It will be understood, however, that the terminals 104 and 28 may be directly connected together by the conductor 112, as illustrated in Fig. 4, and that other elements may be inserted in the conductors 110 and 112, such as the resistor 33 and the condenser 34 of Fig. 4. The terminals 106 and 108 may similarly be connected by conductors 114 and 116 to any desired load through the medium of terminals 29 and 30, which thus constitute the output terminals of the system. These output terminals are represented in Fig. 1 as 69, 70, in Fig. 3 as 71, 72, in Fig. 4 as 36, 37, in Fig. 5 as 73, 74 and in Fig. 6 as 66, 67.

The said degenerative network 26 is connected between the input terminals 27 and 28 and the output terminals 29 and 30 of the system so as to feed back energy from the output circuit of the amplifier to its input circuit. To this end, the input of the feed-back network 26 is shown connected by conductors 118 and 120 to the output circuit of the amplifier 25, and the output of the network is connected to the input circuit of the amplifier. By thus feeding the input of the network back to the input circuit of the amplifier, the net voltage on the input circuit of the amplifier is constituted of the combination of the voltage applied from the voltage source to the terminals 27 and 28 and the voltage obtained from the degenerative network 26.

In accordance with the present invention, therefore, selectivity is obtained with the aid of a resistance-capacitance network, but without introducing loss in the normal transmission of the system at the frequencies of maximum transmission.

The transmission characteristics of the feed-back network 26 are similar to those shown in Fig. 7, so as to provide maximum attenuation or zero transmission or coupling at that frequency or frequencies where it is desired that the system as a whole shall provide maximum transmission. At other frequencies, which the amplifier would normally pass, the network provides a certain amount of transmission and the voltage obtained from the network is fed back to the amplifier input, so that it has a phase difference between 90 and 270 degrees with respect to the voltage applied to terminals 27 and 28. Accordingly, as the voltage obtained from the feed-back network increases, it tends to cancel out the net voltage applied to the amplifier, thus reducing the effective gain of the amplifier, or, if the feed-back is sufficiently great, practically eliminating the gain entirely. At the frequency or frequencies where the degenerative network provides zero or very low transmission or coupling, the net effetive gain of the amplifier is at its maximum or near its maximum, respectively. The result is that the transmission characteristic of the system as a whole between the input terminals 27 and 28 and the output terminals 29 and 30 has a general characteristic as shown in Fig. 8. It will be seen that the difference in transmission of the system between the frequencies of maximum and minimum transmission, which characteristic may be defined as the maximum suppression of the system, depends upon both the gain of the amplifier and the transmission characteristics of the degeneration network. The effect of shifting the amplifier gain is to change appreciably the transmission at those frequencies where the transmission is greatest with only a comparatively minor change in the transmission where it is at a minimum, thus modifying the selectivity curve and changing the maximum suppression.

It is evident that there are many combinations of apparatus and circuits which will produce this result. The amplifier, for instance, may be one of the more conventional vacuum-tube types employing transformers, resistances, condensers, and, if desired, inductances or transformers as coupling units, or the amplifier may be of some electro-mechanical or other type. The feed-back circuit, also, may be one of many arrangements which will provide the desired characteristics. Since there are a great number of filter and bridge circuits which provide zero or very low transmission at a single frequency or over a band of frequencies, it is obvious that the invention covers a large number of possible circuit arrangements. Figs. 3 and 4 show two systems employing common types of resistance-capacitance networks for the inverse feed-back system. In Fig. 3, the inverse feed-back system is illustrated as comprising the before-mentioned Wien bridge. Circuits of this type are widely used for measuring frequency, in which application the suppression of a single frequency or narrow band of frequencies is important. In this use of the Wien bridge, however, the combination with the amplifier and associated apparatus provides an over-all response characteristic which is at a maximum at that frequency to which the bridge is balanced. In a circuit of this type, the response characteristics are determined by the relative values of the resistances and the condensers. The characteristics of the network may be varied by varying all or some of these components.

As illustrated in Fig. 3, the two opposite vertices 122 and 124 of the bridge may be respectively connected to the conductor 112 and a conductor 126 leading to the input terminal 42. The output circuit of the Wien bridge is thus connected to the input circuit of the amplifier. The vertices 122 and 124 may, however, be directly connected to the conductors 112 and 110, as suggested in Fig. 4. The other two opposite vertices 128 and 130 are shown respectively connected by conductors 132 and 134 to the secondary winding 136 of a transformer 40 the primary winding 138 of which is connected by the conductors 114 and 116 to the amplifier output terminals 106 and 108. The output circuit of the amplifier is thus connected to the input circuit of the Wien bridge.

The coupling of the degenerative coupling means is substantially zero at the predetermined single frequency in question, as is true with all networks having an exact null or zero at balance. The coupling transformer 40 merely provides the proper balanced-to-ground circuits for the bridge. It is obvious that transformer 40 could be connected between the bridge and the input circuit of the amplifier as well as in the position shown in the diagram. The primary winding 138 of the transformer 40, for example, may be connected to the vertices 122 and 124 of the bridge and the secondary winding 136 to the conductors 112 and 126, the vertices 128 and 130 of the bridge being then directly connected to the conductors 114 and 116.

Fig. 4 represents an improvement over the circuit shown in Fig. 3 in that no transformer 40 is used, since the degeneration network 26 consists of a three-terminal network having one terminal 140 common to both its input and its output circuits. The terminal 140 is shown connected by a conductor 142 to the terminal 108 and by a conductor 144 to the terminal 104. One of the other two terminals of the network is shown at 146, connected by a conductor 148 to the terminal 106. The third terminal of the network is shown at 150, connected by a conductor 152, through a resistor 35, to the terminal 102. The particular three-terminal network shown is the previously described double-T network, having a characteristic similar to the Wien bridge of Fig. 3, and the frequency of zero transmission may be varied by shifting the resistances 43, 44 and 48, or the condensers 45, 46 and 47, or all six components. It will be noted that in this diagram the feed-back voltage is fed into the amplifier 38 in parallel with the voltage from the source 76 applied to the input terminals 31 and 32. The network consisting of resistances 33 and 35 and condenser 34 is so arranged that neither the feed-back network nor any equipment connected to terminals 31 and 32 has any appreciable effect upon the characteristics of the other. In general an input system of this type provides somewhat less over-all sensitivity than that shown in Fig. 3, but has the important advantage that the input of the system as a whole has one terminal 140 in common with the input of the amplifier.

The two methods of introducing the degeneration voltage into the amplifier, as shown in Figs. 3 and 4, are, of course, interchangeable. Either the series or the parallel arrangement may be used. Any choice between these systems will generally depend upon consideration of the particular application of the invention and, in general, upon the type of circuit or source of energy to be connected to the input of the system. It is also understood that more elaborate arrangements for coupling the feed-back circuit to the amplifier may be used, and they may consist of transformers, additional amplifying stages, etc.

There are several advantages of a system of this type which should be noted. In the first place, if the inverse-feed-back network provides complete suppression at a certain frequency, the amplifier gain is normal at that frequency and not affected by the network. Accordingly, if an adjustable network is used so that its zero transmission frequency is adjustable and if the network is so designed and constructed that practically complete suppression is obtained at any frequency to which it is adjusted, the sensitivity of the amplifier to that frequency will be the same as the sensitivity of the amplifier to the same frequency when the network is not used. It is, accordingly, a relatively simple matter to obtain practically constant sensitivity over a wide frequency range by merely using an amplifier with practically constant gain over that range and a feed-back network which gives practically complete suppression at the passed frequency. Of course, if the amplifier characteristic is not flat over a wide range, or if the feed-back network does not give complete suppression, one of these characteristics may be made to balance the other. It should also be noted that since the feed-back network operates directly into a grid circuit, as illustrated in Fig. 1, or into a high-impedance circuit, and may consist itself of high impedances, no appreciable amount of power need be drawn from the amplifier output by the feed-back system.

It should also be noted that since the feed-back network provides suppression at the frequencies which the system transmits as a whole, it is a simple matter to include several similar networks but tuned or balanced to different frequencies in order to obtain two or more pass bands. Fig. 5 shows an arrangement of this sort consisting of amplifier 56 and two feed-back networks 57 and 58, one operating into the other. Since the combination of these two networks may be made to suppress two frequencies or two bands of frequencies, a characteristic is obtained of the general character shown in Fig. 9. Obviously, other networks may be added to the system to provide other pass bands. It is also, of course, possible to combine the several networks into a single network which will provide the same net results.

According to the preferred embodiment of the invention illustrated in Fig. 1, the amplifier is of the three-stage direct-coupled type, the stages being represented by vacuum tubes 12, 14 and 16, each comprising a cathode 156, a grid 154 and an anode or plate 158. The input circuit of the amplifier, to which the source 76 is connected, may be traced from the terminal 20, by way of the conductor 110, through the resistor 9 and the condenser 10, to the terminal 102, and thence to the grid 154 of the tube 12; and from the grid 154 to the filament or cathode 156, a resistor 22 and a condenser 23, in parallel, to the terminal 104; and finally by way of the conductor 112, to the terminal 21. A resistor 75 may be connected in parallel to the grid 154 and the filament 156. The tube 12 is provided with an output circuit extending from its plate or anode 158, by way of a conductor 160, and through a resistor 13, to a plate battery 24, and thence, by way of a conductor 162, to the filament 154. The input circuit of the second stage 14 of the amplifier is shown connected across the resistor 13, and its output circuit is provided with a similar resistor 15 across which the input circuit of the third stage 16 is connected. The output circuit of the amplifier extends from the plate or anode 158 of the tube 16, by way of a conductor 164, to the terminal 106; and through a resistor 17 to the battery 24, and the terminal 108. Each grid 154 of each tube except the first is galvanically or directly connected to the anode of the preceding tube.

The connection from the cathode 156 of the tube 12 to the resistor 22 is shown as variable, thus to render it possible to vary the gain of the amplifier, thus to adjust the width of the band of frequencies to which the system is selective. The same result may be arrived at by varying the potentiometer 194 of Fig. 12.

An amplifier of this type is not necessary, but the particular arrangement shown is used since the phase shift at low frequencies between the grid 154 of the first tube 12 and the plate 158 of the last tube 16 is always between 180 and 270 degrees. This simplifies the design of the feedback circuit. Any other type of amplifier can also be used, however, it being merely necessary to keep the total phase shift through the amplifier and the feed-back circuit such that a serious amount of regeneration does not take place. That is, for any frequency for which the amplifier gain is greater than the attenuation in the feed-back network the total phase shift should be between 90 and 270 degrees in order to provide proper degeneration. For these reasons, an amplifier comprising an odd number of stages is frequently desirable and the direct-coupling feature prevents undesirable phase shifts, even at very low frequencies.

The amplifier shown is battery-operated at 24, but, obviously, any suitable power-supply equipment could be used. The heaters or filaments 156 of the tubes must, of course, be operated from suitable batteries or transformers.

The components enclosed within the dotted line marked 2 comprise a feed-back circuit of the double-T network type, as shown in Fig. 4. The particular arrangement shows the resistances 3, 4 and 5 variable, and ganged together for operation by a single control, as is illustrated more particularly in Fig. 10. The output of the network 2 is fed back into the amplifier by an arrangement similar to that shown in Fig. 4, by means of the conductors 142 and 152, the resistor 11 of Fig. 1 corresponding to the resistor 35 of Fig. 4. The transmission characteristic of such a system between the input terminals 20, 21 and the output terminals 69, 70 is similar to that of Fig. 4.

For wave-analysis work, a meter or other indicating device 19 may be connected to the output terminals. This indicating device will then show the relative intensity of each component in the wave-form, when resistors 3, 4 and 5 and condensers 6, 7 and 8 are adjusted so that the system is selective to that particular component.

Figure 10:
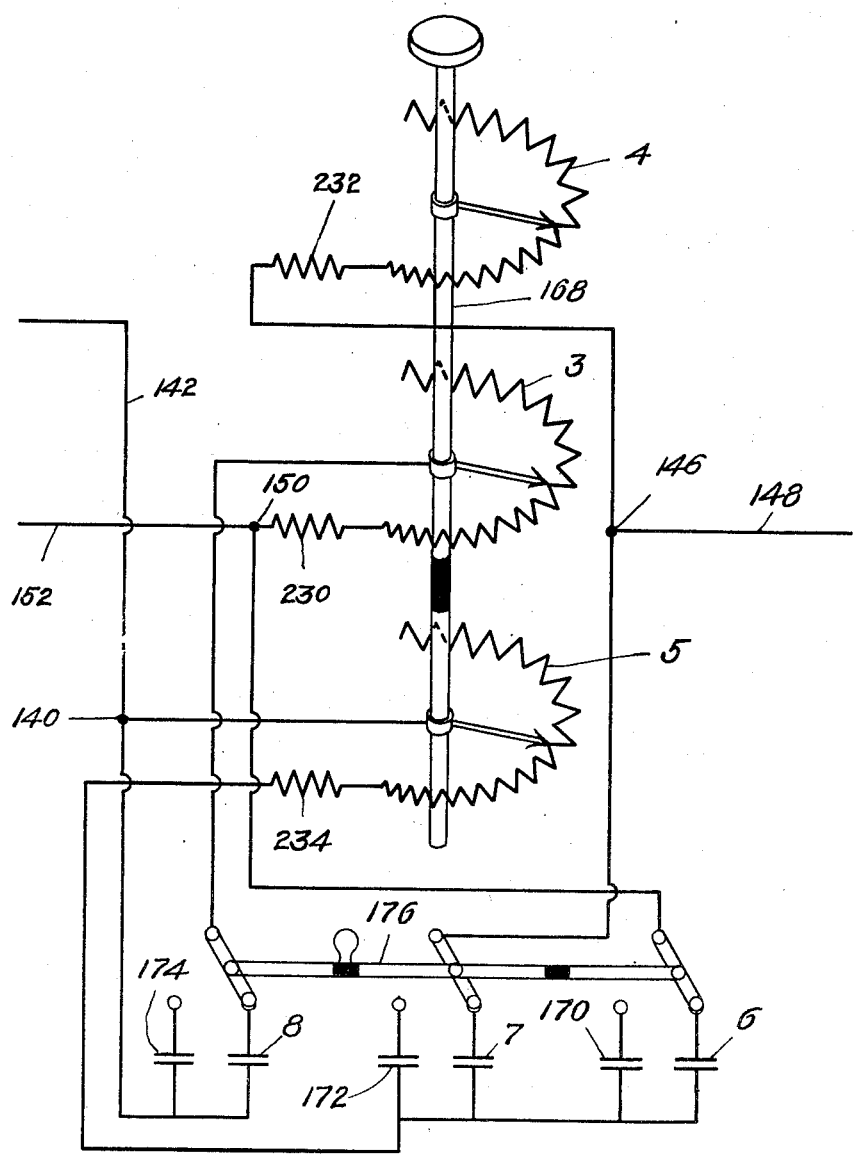

The parallel-T network, including resistances and capacitances only, is shown in the preferred embodiment of the invention of Fig. 1, because this particular type of network is extremely useful at audio frequencies. One condition of balance for such a network is obtained when capacitance 6 equals capacitance 7, each equaling one-half of capacitance 8, when resistance 3 equals resistance 4, each resistance 3 and 4 equaling two times resistance 5, and when the reactance of capacitance 6 is equal in magnitude to resistance 3. This condition of balance for the parallel-T network, as shown in Fig. 1, results in very convenient values for the circuit elements in this network. Obviously, this combination of values lends itself readily to simultaneous operation of the resistances or the condensers by means of a common control. A convenient method for varying such a network over wide ranges at lower frequencies is to employ three variable resistances which are operated by a common control, as illustrated in Fig. 10. By switching various sizes of condensers into the circuit as components 6, 7 and 8, the frequency to which the system is selective may be varied in steps. At higher frequencies, it is sometimes desirable to use variable condensers, which may or may not be connected to a common shaft, and to keep the three resistors fixed, or to vary them in steps by means of a switch. At higher frequencies, a bridged-T network is sometimes more satisfactory than the double-T network on the basis of manufacturing costs and ease of control.

Figure 11:
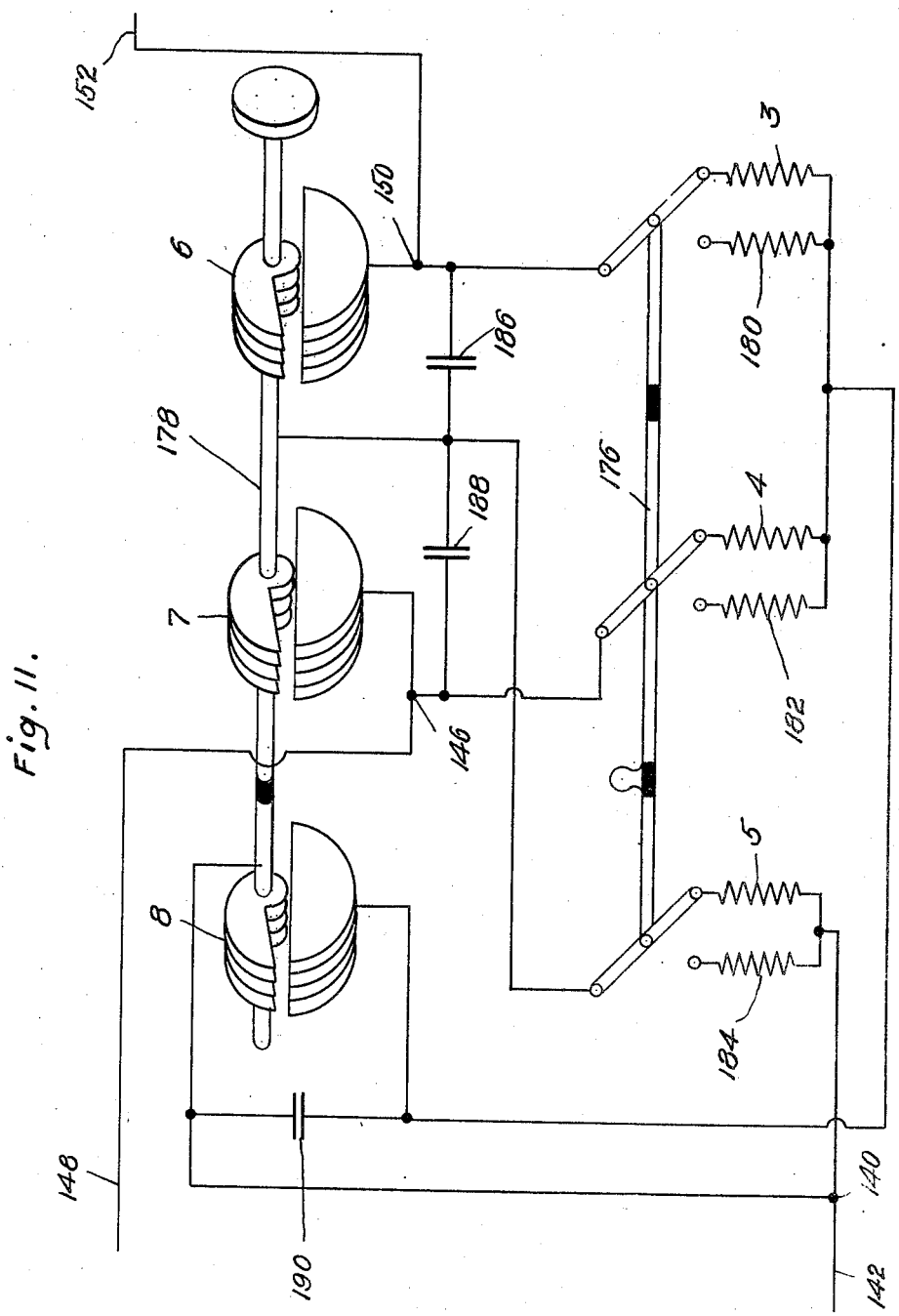

Obviously, the frequency to which this system is selective may be varied by varying the elements in the parallel-T network. A convenient arrangement at lower frequencies is continuously to adjust the three resistances 3, 4 and 5 simultaneously by means of a single control arm 168, and to shift by steps the condensers 6, 7 and 8 or the condensers 170, 172 and 174, respectively, by means of a multi-pole switch 176, as illustrated in Fig. 10. At higher frequencies it may be simpler to use continuously variable condensers 6, 7 and 8 operated by a single control arm 172 and to switch by steps the resistances 3, 4 and 5 or other resistances 180, 182 and 184, respectively, as illustrated in Fig. 11. The condensers 6, 7 and 8 of Fig. 11 are shown bridged by fixed condensers 186, 188 and 190, respectively, for limiting the frequency range. The resistors 230, 232, 234, in series with resistors 3, 4 and 5, respectively, as shown in Fig. 10 are for a similar purpose.

A similar simultaneous adjustment of various of the elements of the Wien-bridge structure of Fig. 3 may be effected as illustrated and described in Letters Patent No. 1,983,447 to Robert F. Field, issued December 4, 1934.

It will be understood that the features illustrated in Figs. 10 and 11 may be embodied in the system of Fig. 1 or other figures, and that the same is true of the other modifications illustrated and described herein. The passive network 26 and the additional amplifier 192 in series therewith illustrated in Fig. 13 may, for example, be embodied in any of the other figures, typified in Fig. 2.

Although the basic circuits shown in Figs. 1, 2, 3, 4 and 5 will provide a certain amount of gain in the pass bands, it is understood that, in some cases, it may be desirable to use such circuits where no gain is necessary or required. Under these conditions it is merely necessary to use the system in conjunction with an attenuator 63, as shown in Fig. 6, which attenuator may be employed to control the sensitivity of the system. The circuit shown includes the amplifier 61, and a feed-back network 62, and functions similarly to the arrangement shown in Fig. 2. By reason of the attenuator 63, however, the over-all amplification or sensitivity may be reduced to any desired value. This attenuator 63, instead of being connected to the output of the system, as shown in Fig. 6, could be connected to the input, as illustrated in Fig. 12. According to the present invention, it is possible to vary the selectivity merely by shifting the gain of the amplifier part of the system without necessitating the changing of any of the frequency- determining elements of the system. This may be effected without changing the over-all sensitivity, if desired, by simultaneously adjusting the attenuator 63 and the potentiometer 194. The potentiometer 194 and the attenuator 63, which are both shown in the input circuit of the first stage, may be actuated simultaneously from a common shaft 195. For constant over-all sensitivity, as previously mentioned, it is obviously necessary to vary the attenuator 63 in such a direction as to tend to decrease the sensitivity when the amplifier gain control 194 is varied in such a direction as to tend to increase the sensitivity, and vice versa.

For the sake of variety, the circuit of Fig. 12 is illustrated as comprising an even number of amplifying stages, respectively, and the phase reversal is illustrated as effected by means of a transformer 196, the primary winding 198 of which is connected in the output circuit of the last amplifier stage, and the secondary winding 200 of which is shown connected to the conductors 114 and 116. By phase reversal, it is intended to denote the before-described shifting of the phase between 90 degrees and 270 degrees.

It will be understood that phase reversals may be effected in other ways also. For example, a coupling may be provided between the output circuit of an even-numbered stage of amplification and the input circuit of a previous even-numbered stage of amplification or between the output of an odd-numbered stage and the input of a previous odd-numbered stage. If the degeneration network includes a transformer or other means for reversing the phase, the degenerative coupling may be from the output of an even-numbered stage of amplification into the input of an odd-numbered stage, or vice versa.

Other modifications and changes will also occur to persons skilled in the art, and all such are considered to fall within the spirit and scope of the present invention, as defined in the appended claims.

What is claimed is:

1. An electric system having, in combination, a source of energy, a multi-stage amplifier having an input circuit coupled to the source and an output circuit, one of the stages of the amplifier being coupled directly to a previous stage of the amplifier, means for degeneratively coupling the output circuit to the input circuit, and means for rendering the degenerative coupling substantially ineffective at a predetermined frequency or frequencies, the system as a whole having parameters such as to provide substantially maximum transmission at the said predetermined frequency or frequencies in order to render the system as a whole selective at the said predetermined frequency or frequencies and such that at frequencies substantially removed from said predetermined frequency or frequencies substantially the whole output voltage of the amplifier is fed degeneratively through the network back to the input circuit of the amplifier.

2. An electric system having, in combination, a source of energy, an amplifier having an input circuit coupled to the source and an output circuit, and means comprising a network degeneratively coupling non-inductively the output circuit to the input circuit in order to reduce the effective gain of the amplifier, the said network having substantially minimum transmission at a predetermined frequency or frequencies, and the system as a whole having parameters such as to provide substantially maximum transmission at the said predetermined frequency or frequencies in order to render the system as a whole selective at the said predetermined frequency or frequencies and such that at frequencies substantially removed from said predetermined frequency or frequencies substantially the whole output voltage of the amplifier is fed degeneratively through the network back to the input circuit of the amplifier.

3. An electric system having, in combination, a source of energy, an amplifier having an input circuit coupled to the source and an output circuit, means comprising a plurality of networks for degeneratively coupling the output circuit to the input circuit, the respective networks having substantially minimum transmission characteristics at respective predetermined frequencies, and the system as a whole having parameters such as to provide substantially maximum transmission at the said respective predetermined frequencies in order to render the system as a whole selective to the said respective predetermined frequencies and such that at frequencies substantially removed from said predetermined frequencies a sufficiently large fraction of the output voltage is fed back degeneratively to the input circuit of the amplifier so as to cancel substantially the entire gain of the amplifier.

4. An electric system having, in combination, a source of energy, a direct-current multi-stage amplifier having an input circuit coupled to the source and an output circuit, and means for degeneratively coupling the output circuit to the input circuit in order to reduce the effective gain of the amplifier, the said means having substantially minimum transmission at a predetermined frequency or frequencies, the system as a whole having parameters such as to provide substantially maximum transmission at the said predetermined frequency or frequencies in order to render the system as a whole selective at the said predetermined frequency or frequencies and such that at frequencies substantially removed from said predetermined frequency or frequencies a sufficiently large fraction of the output voltage is fed back degeneratively to the input circuit of the amplifier so as to cancel substantially the entire gain of the amplifier.

5. An electric system selective to predetermined frequencies having, in combination, a source of energy, an amplifier having an input circuit coupled to the source and an output circuit, means for degeneratively coupling the output circuit to the input circuit in order to reduce the effective gain of the amplifier, and means for rendering the degenerative coupling substantially ineffective at said predetermined frequencies, said means including one or more variable circuit elements for the purpose of varying said predetermined frequencies, the system as a whole having parameters such as to provide substantially maximum transmission at the said predetermined frequencies in order to render the system as a whole selective to the said predetermined frequencies.

6. An electric system having maximum transmission at a single frequency and comprising, in combination, a source of energy, an amplifier having an input circuit coupled to the source and an output circuit, and means for degeneratively coupling the output circuit to the input circuit in order to reduce the effective gain of the amplifier, the said means having substantially minimum transmission at said single frequency, and including one or more variable circuit elements, and the system as a whole having parameters such as to provide substantially maximum transmission at the said single frequency in order to render the system as a whole selective at the said single frequency.

7. An electric system having maximum transmission at a single frequency and comprising, in combination, a source of energy, a direct-coupled multi-stage amplifier having an input circuit coupled to the source and an output circuit, and means for degeneratively coupling the output circuit to the input circuit, the said means comprising a network having common input and output terminals and unprovided with mutually inductive elements, but having substantially zero coupling at said single frequency and including one or more variable circuit elements for the purpose of adjusting the frequency to which the system is selective.

8. An electric system giving peaked response, selectively, at a predetermined frequency or within a predetermined band of frequencies having, in combination, a source of energy, an amplifier having an input circuit coupled to the source and an output circuit, means for degeneratively coupling the output circuit to the input circuit in order to reduce the effective gain of the amplifier, and means for rendering said degenerative coupling substantially ineffective at said predetermined frequency or frequencies, said means including two or more variable circuit elements for varying the said predetermined frequency or frequencies, and means for simultaneously adjusting two or more of the variable circuit elements.

9. An electric system comprising a network and selective with regard to a predetermined frequency or frequencies as predetermined by the characteristics of the component circuit elements of the network, the said electric system having, in combination, a source of energy, an amplifier having an input circuit coupled to the source and an output circuit, means comprising the network for degeneratively coupling the output circuit to the input circuit in order to reduce the effective gain of the amplifier, and means for rendering said degenerative coupling substantially ineffective at said predetermined frequency or frequencies, said means including means for switching one or more of the circuit elements into or out of the degenerative coupling network for the purpose of changing the frequency or frequencies to which the system is selective.

10. An electric system having maximum transmission at a single frequency and comprising, in combination, a source of energy, an amplifier having an input circuit coupled to the source and an output circuit, means for degeneratively coupling the output circuit to the input circuit, said means having substantially zero transmission at said single frequency and comprising a network containing resistances and capacitances only, and means for varying one or more of said resistances and capacitances for the purpose of adjusting the frequency to which the system is selective, the system having parameters such that the system as a whole provides substantially maximum transmission at the said single frequency.

11. An electric system selective to predetermined frequencies and comprising, in combination, a source of energy, an amplifier having an input circuit coupled to the source and an output circuit, means for degeneratively coupling the output circuit to the input circuit, and means for rendering the degenerative coupling means substantially ineffective at said predetermined frequencies, the first-named means comprising a three-terminal network having one terminal common to the input and output circuits and the other two terminals respectively connected to the input and output circuits, the system as a whole having parameters such as to provide substantially maximum transmission at the said predetermined frequencies in order to render the system as a whole selective to the said predetermined frequencies.

12. An electric system having maximum transmission at a single frequency and comprising, in combination, a source of energy, a direct-coupled multi-stage amplifier having an input circuit coupled to the source and an output circuit, means for degeneratively coupling the output circuit to the input circuit, said means having substantially zero coupling at said single frequency and comprising a Wheatstone bridge having a plurality of circuit elements comprising resistances in all four arms thereof, a capacitance in series with one of said resistances, and a second capacitance in parallel with another of said resistance and means for varying one or more of the circuit elements in said bridge for the purpose of adjusting the frequency to which the system is selective.

13. An electric system selective to a single frequency and comprising, in combination, a source of energy, an amplifier having an input circuit coupled to the source and an output circuit, means for degeneratively coupling the output circuit to the input circuit, said means having substantially zero coupling at said single frequency and comprising a parallel-T network, and means for adjusting one or more of the circuit elements in said network for the purpose of selecting the frequency to which the system is selective.

14. An electric system selective with regard to frequency and comprising, in combination, a source of energy, an amplifier having an input circuit coupled to the source and an output circuit, means comprising a parallel-T network containing resistances and capacitances only for degeneratively coupling the output circuit to the input circuit, said network having substantially zero transmission at a frequency determined by the characteristics of its component elements, means for adjusting all resistances therein simultaneously for continuous adjustment of the frequency to which the system is selective, and means comprising a multi-pole switch for switching the capacitances into said circuit selectively to adjust in steps the frequency to which the system is selective.

15. An electric system having, in combination, a source of energy, an amplifier having an input circuit coupled to the source and an output circuit, means comprising a parallel-T network containing a plurality of resistors and a plurality of capacitors for degeneratively coupling the output circuit to the input circuit, the said network having substantially zero transmission at a frequency determined by the characteristics of its component elements, means for adjusting the capacitors continuously, and means for switching the resistors into circuit selectively.

16. An electric system having maximum transmission at a single frequency and comprising, in combination, a source of energy, an amplifier having an input circuit coupled to the source and an output circuit, means for degeneratively coupling the output circuit to the input circuit, said means having substantially zero coupling at said single frequency and comprising a bridged-T network, and the system as a whole having parameters such as to provide substantially maximum transmission at the said single frequency in order to render the system as a whole selective at the said single frequency.

17. An electric system selective to predetermined frequencies comprising, in combination, a source of energy, an amplifier having an input circuit coupled to the source and an output circuit, means comprising a network for degeneratively coupling the output circuit to the input circuit, and means for rendering said degenerative coupling substantially ineffective at said predetermined frequencies and for varying the gain of said amplifier for the purpose of varying the selectivity of the system, the system as a whole having parameters such as to provide substantially maximum transmission at the said predetermined frequencies in order to render the system as a whole selective at the said predetermined frequencies.

18. An electric system selective to predetermined frequencies having, in combination, a source of energy, an amplifier having an input circuit coupled to the source and an output circuit, means for degeneratively coupling the output circuit to the input circuit, and means for rendering the degenerative coupling means substantially ineffective at said predetermined frequencies, said degenerative coupling means comprising a passive network and a second amplifier, the system as a whole having parameters such as to provide substantially maximum transmission at the said predetermined frequencies in order to render the system as a whole selective at the said predetermined frequencies.

19. An electric system comprising a first circuit having an input circuit and an output circuit, a second circuit having an input circuit and an output circuit and having a characteristic curve such that the transmission of the second circuit shall be rendered substantially ineffective at a predetermined frequency or frequencies, and means for coupling the second-named input circuit to the first-named output circuit and the second-named output circuit to the first-named input circuit to feed back energy from the first-named output circuit to the first-named input circuit through the second circuit, the system comprising means for effecting a reversal of phase between the voltage in the first-named input circuit and the voltage applied to the first-named input circuit by the second-named output circuit, the system as a whole having parameters such as to provide substantially maximum transmission at the said predetermined frequency or frequencies in order to render the system as a whole selective to the said predetermined frequency or frequencies.

20. An electric system comprising an amplifier having an input circuit and an output circuit, a network having a characteristic curve such that the transmission of the network shall be rendered substantially ineffective at a predetermined frequency or frequencies, and means for degeneratively coupling the output circuit to the input circuit to feed back energy from the output circuit to the input circuit through the network, the system comprising means for effecting a reversal of phase between the voltage of the input circuit and the voltage applied to the input circuit by the network, the system as a whole having parameters such as to provide substantially maximum transmission at the said predetermined frequency or frequencies in order to render the system as a whole selective at the said predetermined frequency or frequencies.

21. An electric system comprising an amplifier having an input circuit and an output circuit, a three-terminal network having a characteristic curve such that the transmission of the network shall be rendered substantially ineffective at a predetermined frequency or frequencies, and means connecting two of the terminals of the network to the output circuit and one of the said two terminals and the third terminal of the network to the input circuit to feed back energy from the output circuit to the input circuit through the network, the system comprising means for effecting a reversal of phase between the voltage in the input circuit and the voltage applied to the input circuit by the network, the system as a whole having parameters such as to provide substantially maximum transmission at the said predetermined frequency or frequencies in order to render the system as a whole selective at the said predetermined frequency or frequencies.

22. An electric system comprising a network and selective with regard to frequency as predetermined by the characteristics of the component circuit elements of the network, the said electric system having, in combination, a source of energy, an amplifier having an input circuit coupled to the source and an output circuit, and means comprising the network for degeneratively coupling the output circuit to the input circuit, the network having common input and output terminals and having substantially zero transmission at the predetermined frequency.

23. An electric system comprising a network and selective with regard to frequency as predetermined by the characteristics of the component circuit elements of the network, the said electric system having, in combination, a source of energy, an amplifier having an input circuit coupled to the source and an output circuit, means comprising the network for degeneratively coupling the output circuit to the input circuit, the network having common input and output terminals and having substantially zero transmission at the predetermined frequency, and means for adjusting said component elements to adjust the predetermined frequency.

24. An electric system comprising a network and selective with regard to frequency as predetermined by the characteristics of the component circuit elements of the network, the said electric system having, in combination, a source of energy, an amplifier having an input circuit coupled to the source and an output circuit, the amplifier comprising more than one stage, one of the stages being directly coupled to a previous stage, and means comprising the network for degeneratively coupling the output circuit to the input circuit, the network having substantially zero transmission at the predetermined frequency.

25. An electric system comprising a network and selective with regard to frequency as predetermined by the characteristics of the component circuit elements of the network, the said electric system having, in combination, a source of energy, an amplifier having an input circuit coupled to the source and an output circuit, the amplifier comprising more than one stage, one of the stages being directly coupled to a previous stage, means comprising the network for degeneratively coupling the output circuit to the input circuit, the network having substantially zero transmission at the predetermined frequency, and means for adjusting said component elements to adjust the predetermined frequency.

26. An electric system comprising a network and selective with regard to frequency as predetermined by the characteristics of the component circuit elements of the network, the said electric system having, in combination, a source of energy, an amplifier having an input circuit coupled to the source and an output circuit, the amplifier comprising a plurality of tubes each having a cathode, a grid and an anode, input and output circuits for each tube comprising, respectively, the grid and the cathode, and the plate and the cathode, of the respective tubes, each grid of each tube except the first being galvanically connected to the plate of the preceding tube, and means comprising the network for degeneratively coupling the output circuit of the amplifier to the input circuit of the amplifier, the network having a common input terminal and output terminal and having substantially zero transmission at the predetermined frequency.

27. An electric system comprising a network and selective with regard to frequency as predetermined by the characteristics of the component circuit elements of the network, the said electric system having, in combination, a source of energy, an amplifier having an input circuit coupled to the source and an output circuit, the amplifier comprising a plurality of tubes each having a cathode, a grid and an anode, input and output circuits for each tube comprising, respectively, the grid and the cathode, and the plate and the cathode, of the respective tubes, each grid of each tube except the first being galvanically connected to the plate of the preceding tube, means comprising the network for degeneratively coupling the output circuit of the amplifier to the input circuit of the amplifier, the network having a common input terminal and output terminal and having substantially zero transmission at the predetermined frequency, and means for adjusting said component elements to adjust the predetermined frequency.

28. An electric system selective with regard to frequency and comprising, in combination, a source of energy, an amplifier having an input circuit coupled to the source and an output circuit, means comprising a bridged-T network for degeneratively coupling the output circuit to the input circuit, the network having substantially zero transmission at a frequency determined by the characteristics of its component elements, and means for adjusting said component elements for adjustment of the frequency to which the system is selective.

29. An electric system selective with regard to frequency having, in combination, a source of energy, an amplifier having an input circuit coupled to the source and an output circuit, means comprising a parallel-T network containing a plurality of resistors and a plurality of capacitors for degeneratively coupling the output circuit to the input circuit, the said network having substantially zero transmission at a frequency determined by the characteristics of its component elements, and means for adjusting the values of the component parts of said network for the purpose of changing the frequency to which the system is selective.

30. An electric system selective with regard to frequency having, in combination, a source of energy, an amplifier having an input circuit coupled to the source and an output circuit, means comprising a parallel-T network containing a plurality of resistors and a plurality of capacitors for degeneratively coupling the output circuit to the input circuit, the said network having substantially zero transmission at a frequency determined by the characteristics of its component elements, and means for adjusting simultaneously the values of two or more of the component parts of said network for the purpose of changing the frequency to which the system is selective.

31. An electric system selective with regard to frequency and comprising, in combination, a source of energy, an amplifier having an input circuit coupled to the source and an output circuit, means comprising a three-terminal network containing resistances and capacitances only for degeneratively coupling the output circuit to the input circuit, said network having substantially zero transmission at a frequency determined by the characteristics of its component elements, means for adjusting all resistances therein simultaneously for continuous adjustment of the frequency to which the system is selective, and means comprising a multi-pole switch for switching the capacitances into said circuit selectively to adjust in steps the frequency to which the system is selective.

32. An electric system selective with regard to frequency having, in combination, a source of energy, an amplifier having an input circuit coupled to the source and an output circuit, means comprising a three-terminal network containing a plurality of resistors and a plurality of capacitors for degeneratively coupling the output circuit to the input circuit, the said network having substantially zero transmission at a frequency determined by the characteristics of its component elements, means for adjusting the capacitors continuously, and means for switching the resistors into the circuit selectively.

33. An electric system selective with regard to frequency having, in combination, a source of energy, an amplifier having an input circuit coupled to the source and an output circuit, means comprising a three-terminal network containing a plurality of resistors and a plurality of capacitors for degeneratively coupling the output circuit to the input circuit, the said network having substantially zero transmission at a frequency determined by the characteristics of its component elements, and means for adjusting the values of the component parts of said network for the purpose of changing the frequency to which the system is selective.

34. An electric system selective with regard to frequency and comprising, in combination, a source of energy, an amplifier having an input circuit coupled to the source and an output circuit, means comprising a parallel-T network containing resistances and capacitances only for degeneratively coupling the output circuit to the input circuit, said network having substantially zero transmission at a frequency determined by the characteristics of its component elements, means for adjusting all resistances therein simultaneously for continuous adjustment of the frequency to which the system is selective, means comprising a multi-pole switch for switching the capacitances into said circuit selectively to adjust in steps the frequency to which the system is selective, and means for indicating the output voltage or energy of the system.

35. An electric system having, in combination, a source of energy, an amplifier having an input circuit coupled to the source and an output circuit, means comprising a parallel-T network containing a plurality of resistors and a plurality of capacitors for degeneratively coupling the output circuit to the input circuit, the said network having substantially zero transmission at a frequency determined by the characteristics of its component elements, means for adjusting the capacitors continuously, means for switching the resistors into the circuit selectively, and means for indicating the output voltage or energy of the system.

36. An electric system, selective with regard to frequency and comprising, in combination, a source of energy, an amplifier having an input circuit coupled to the source and an output circuit, means comprising a three-terminal network containing resistances and capacitances only for degeneratively coupling the output circuit to the input circuit, said network having substantially zero transmission at a frequency determined by the characteristics of its component elements, means for adjusting all resistances therein simultaneously for continuous adjustment of the frequency to which the system is selective, means comprising a multi-pole switch for switching the capacitances into said circuit selectively to adjust in steps the frequency to which the system is selective, and means for indicating the output voltage or energy of the system.

37. An electric system having, in combination, a source of energy, an amplifier having an input circuit coupled to the source and an output circuit, means comprising a three-terminal network containing a plurality of resistors and a plurality of capacitors for degeneratively coupling the output circuit to the input circuit, the said network having substantially zero transmission at a frequency determined by the characteristics of its component elements, means for adjusting the capacitors continuously, means for switching the resistors into the circuit selectively, and means for indicating the output voltage or energy of the system.

38. An electric system, selective with regard to frequency and comprising, in combination, a source of energy, an amplifier having an input circuit coupled to the source and an output circuit, means for degeneratively coupling the output circuit to the input circuit, said means comprising a network having common input and output terminals, said network having substantially zero transmission at a frequency determined by the characteristics of the component elements, and means for adjusting said component elements for adjustment of the frequency to which the system is selective.

39. An electric system selective with regard to frequency having, in combination, a source of energy, an amplifier having an input circuit coupled to the source and an output circuit, means comprising a parallel-T network containing a plurality of resistors and a plurality of capacitors for degeneratively coupling the output circuit to the input circuit, the said network having substantially zero transmission at a frequency determined by the characteristics of its component elements, and means for adjusting the transmission characteristics of said network for the purpose of adjusting the selectivity of the system.

40. An electric system, selective with regard to frequency, having, in combination, a source of energy, an amplifier having an input circuit coupled to the source and an output circuit, means comprising a parallel-T network containing a plurality of resistors and a plurality of capacitors for degeneratively coupling the output circuit to the input circuit, the said network having substantially zero transmission at a frequency determined by the characteristics of its component elements, and means for adjusting the gain of said amplifier for the purpose of adjusting simultaneously the gain and selectivity of the system.

41. An electric system, selective with regard to frequency and comprising, in combination, a source of energy, an amplifier having an input circuit coupled to the source and an output circuit, and means comprising a parallel-T network containing resistances and capacitances only for degeneratively coupling the output circuit to the input circuit, said network having substantially zero transmission at a frequency determined by the characteristics of its component elements, and said amplifier having an odd number of amplifying stages in order to provide substantially 180 degrees phase shift between the input and output circuits.

42. An electric system, selective with regard to frequency and comprising, in combination, a source of energy, an amplifier having an input circuit coupled to the source and an output circuit, and means comprising a parallel-T network containing resistances and capacitances only for degeneratively coupling the output circuit to the input circuit, said network having substantially zero transmission at a frequency determined by the characteristics of its component elements, and said amplifier comprising a plurality of amplifying stages including vacuum tubes, with the grid of each tube except the first connected directly to the plate of the tube in the preceding stage.

43. An electric system, selective with regard to frequency and comprising, in combination, a source of energy, an amplifier having an input circuit coupled to the source and an output circuit, and means comprising a parallel-T network containing resistances and capacitances only for degeneratively coupling the output circuit to the input circuit, said network having substantially zero coupling at a frequency determined by the characteristics of its component elements, and said amplifier including means for reversing the phase between the input and output circuits.

44. An electric system comprising a plurality of successively connected vacuum tubes each having a cathode, a grid and an anode, an input circuit of each tube connected to the grid and the cathode and an output circuit connected to the anode and the cathode of each tube, the grid of one or more of the tubes being galvanically connected to the anode of the preceding tube, said one or more of the tubes having a resistor and a condenser in parallel in common to its or their input and output circuits.

45. An electric system comprising a plurality of successively connected tubes each having a cathode, a grid and an anode, an input circuit of each tube connected to the grid and the cathode and an output circuit connected to the anode and the cathode of each tube, the grid of one or more of the tubes being galvanically connected to the anode of the preceding tube, said one or more of the tubes having a resistor in common to its or their input and output circuits, the said resistor being connected also in one of the tubes preceding the said one or more of the tubes.

46. An electric system comprising a plurality of successively connected vacuum tubes each having a cathode, a grid and an anode, an input circuit of each tube connected to the grid and the cathode and an output circuit connected to the anode and the cathode of each tube, the grid of one or more of the tubes being galvanically connected to the anode of the preceding tube, said one or more of the tubes having a resistor in common to its or their input and output circuits, the said resistor being connected also in the input circuit of one of the tubes preceding the said one or more of the tubes.

47. An electric system comprising a plurality of successively connected vacuum tubes each having a cathode, a grid and an anode, an input circuit of each tube connected to the grid and the cathode and an output circuit connected to the anode and the cathode of each tube, the grid of one or more of the tubes being galvanically connected to the anode of the preceding tube, said one or more of the tubes having a resistor and a condenser in parallel in common to its or their input and output circuits, the said resistor and condenser being connected also in one of the tubes preceding the said one or more of the tubes.

48. An electric system comprising a plurality of successively connected vacuum tubes each having a cathode, a grid and an anode, an input circuit of each tube connected to the grid and the cathode and an output circuit connected to the anode and the cathode of each tube, the grid of one or more of the tubes being galvanically connected to the anode of the preceding tube, said one or more of the tubes having a resistor and a condenser in parallel in common to its or their input and output circuits, the said resistor and condenser being connected also in the input circuit of one of the tubes preceding the said one or more of the tubes.

49. An electric system comprising a plurality of vacuum tubes each having a cathode, a grid and an anode, an input circuit of each tube connected to the grid and the cathode and an output circuit connected to the anode and the cathode of each tube, the grid of one or more of the tubes being galvanically connected to the anode of the preceding tube, said one or more of the tubes having a resistor in common to its or their input and output circuits, means for degeneratively coupling the output of the system to the input of the system, and means for rendering said coupling means ineffective at a predetermined frequency.

50. An electric system comprising a plurality of vacuum tubes each having a cathode, a grid and an anode, an input circuit of each tube connected to the grid and the cathode and an output circuit connected to the anode and the cathode of each tube, the grid of one or more of the tubes being galvanically connected to the anode of the preceding tube, said one or more of the tubes having a resistor and a condenser in parallel in common to its or their input and output circuits, means for degeneratively coupling the output of the system to the input of the system, and means for rendering said coupling means ineffective at a predetermined frequency.

HERMON H. SCOTT.